Jan. 23, 1940.  R. J. RUTHS ET AL  2,187,754
VARIABLE PITCH PROPELLER
Filed Aug. 12, 1938  2 Sheets-Sheet 2
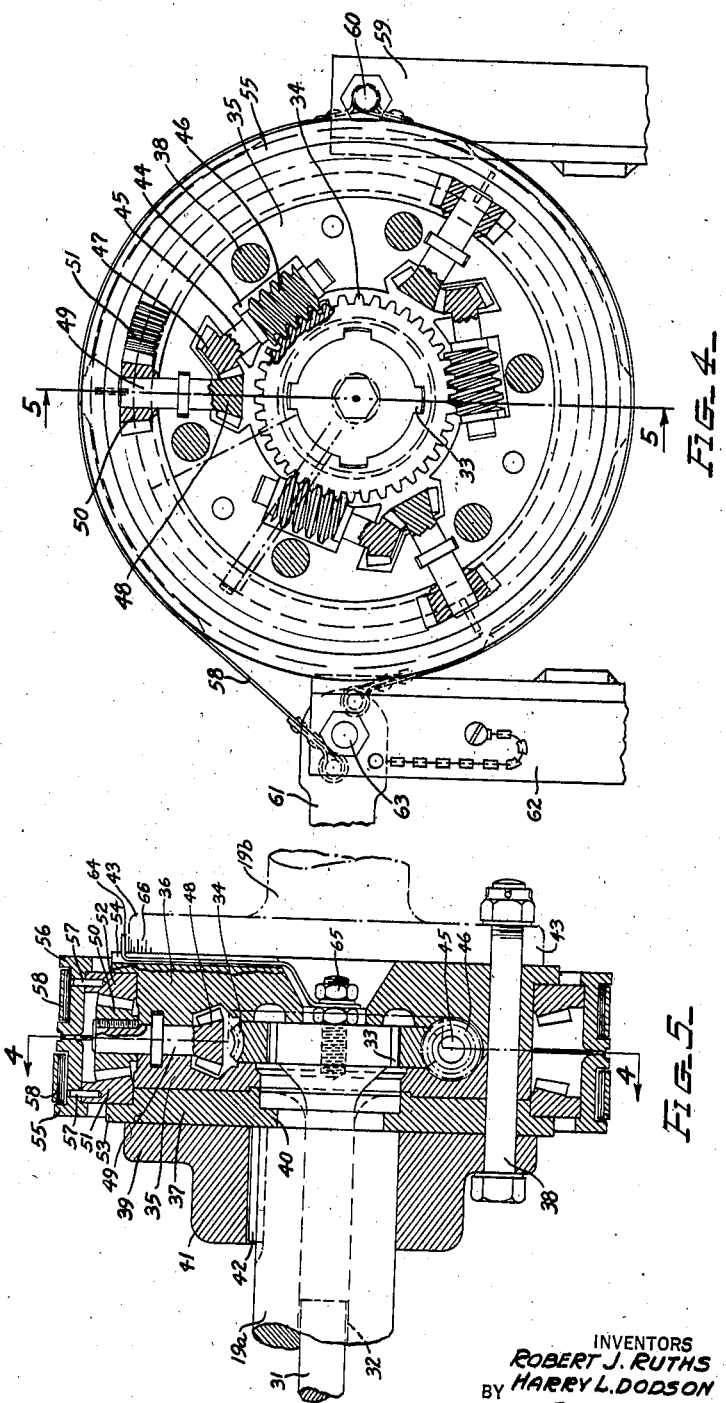
INVENTORS
ROBERT J. RUTHS
BY HARRY L. DODSON
ATTORNEY Patented Jan. 23, 1940

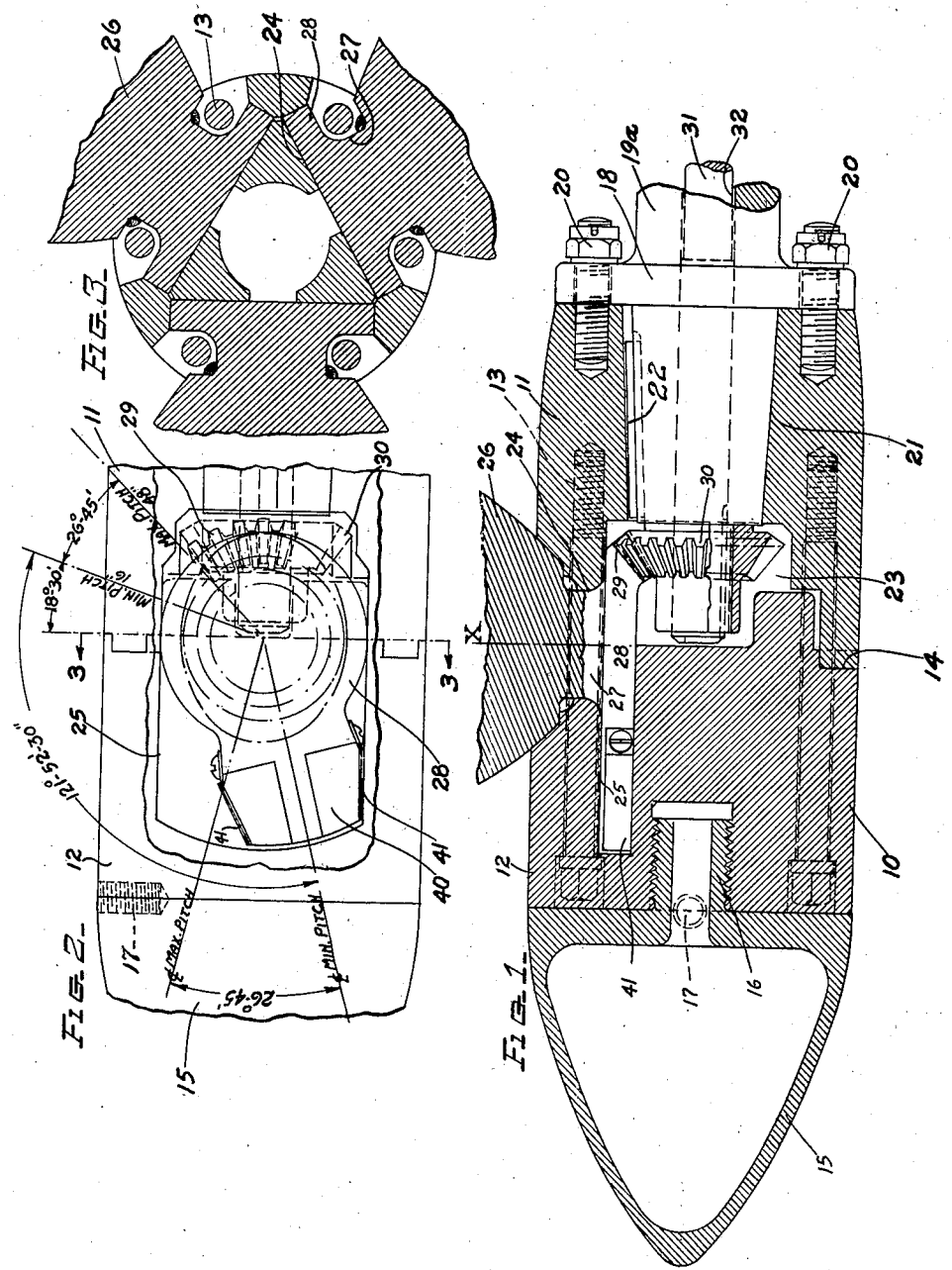

2,187,754

UNITED STATES PATENT OFFICE 2,187,754

VARIABLE PITCH PROPELLER

Robert J. Ruths, Baltimore, Md., and Harry L. Dodson, United States Navy

Application August 12, 1938, Serial No. 224,525

1 Claim. (Cl. 170—163)

(Granted under the act of March 3, 1883, as amended April 30, 1928; 370 O. G. 757)

This invention relates to variable pitch propellers, either of the puller or the pusher type, and it has for its principal object the provision of a new and improved propeller of the character described in which the pitch of the several blades may be adjusted manually and with relative ease while the propeller is in motion and in which the blades will be automatically locked against displacement after such adjustment.

With these and other objects in view, as well as other advantages that may be incident to the use of the improvements, the invention consists in the parts and combinations thereof hereinafter set forth and claimed, with the understanding that the several necessary elements constituting the same may be varied in proportion and arrangement without departing from the nature and scope of the invention, as defined in the appended claim.

In order to make the invention more clearly understood, there are shown in the accompanying drawings, means for carrying the invention into practical use, without limiting the improvements in their useful application to the particular construction, which, for the purpose of explanation, have been made the subject of illustration.

In the accompanying drawings:

Fig. 1 is a longitudinal sectional view through a propeller hub embodying the invention;

Fig. 2 is a side elevational view with parts broken away of the structure shown in Fig. 1;

Fig. 3 is a transverse sectional view taken on line 3—3 of Fig. 2;

Fig. 4 is a transverse sectional view through the planetary gear mechanism for varying the pitch of the propeller blades taken on line 4—4 of Fig. 5, and Fig. 5 is a longitudinal sectional view taken on the line 5—5 of Fig. 4.

Referring to the drawings, a variable pitch propeller of the pusher type constructed according to the invention is shown as comprising a hub 10 having a forward portion 11 and an after portion 12 secured together by longitudinally extending bolts 13 and provided with a scarf joint 14 therebetween to prevent relative rotation of the parts and to relieve the bolts 13 from shearing strains. A hollow streamline hub cap 15 is secured to the after portion 12 of the hub by means of a nipple 16 provided on the former for screw threaded engagement with the latter and is prevented from becoming unscrewed by a lock screw 17 threaded into both the portion 12 and cap 15 in the plane of their contacting faces and functioning as a key therebetween. The forward end of the portion 11 of the hub is fixed to collar 18 formed on a section 19a of a main drive shaft by means of bolts 20 and is provided with a tapered bore 21 into which the rear end of the shaft 19a extends and is secured therein by a key 22. The adjacent ends of the portions 11 and 12 of the hub are recessed to form a central gear chamber 23 and their marginal edges around the gear chamber are also formed with complementary semi-circular recesses providing a plurality of circumferentially arranged sockets 24, herein shown as constituting three in number. These sockets each open into the gear chamber 23 and also into an inner rearwardly elongated channel 25 formed in the after portion 12 of the hub (Figs. 1 and 2). A plurality of propeller blades 26 are mounted on the hub 10 and their root portions are each formed with a neck 27 which is journalled in the socket 24 and a collar 28 disposed within the associated channel 25 for preventing radial displacement of the blade but permitting the blade to rotate about a radially extending axis X. The collars 28 are each formed with a segmental bevel gear 29 which meshes with a single bevel pinion 30 disposed within the chamber 23, thus insuring that the blades 26 will move in unison when rotated about their axes X, in a manner hereinafter to be described.

The pinion 30 is fixed to the rear end of a flexible torsion or quill shaft 31 which extends forwardly through an axial bore 32 formed in the section 19a of the main drive shaft. The extreme forward end of the torsion shaft 31 is fixed to an external circular spline 33 (Fig. 5) which interlocks with an internal spline surface formed in a worm gear 34. This worm gear is mounted for rotation between two circular plates 35 and 36 which are clamped together and to a third circular plate 37 by means of bolts 38 passing through these plates and a flange 39 provided on a collar 41, which is fixed to the section 19a of the main drive shaft by means of a key 42, and also through an annular flange 43 formed on a forward section 19b of said drive shaft. The plate 37 is formed in two parts to facilitate assembly and is provided with an internal annular flange 40 for engagement with a circumferential groove formed in the drive shaft 19a. The assembly is thus maintained against endwise movement.

Mounted in recesses 44 formed in the plates 35 and 36 which form a housing therefor and on shafts 45 journalled at each end in said plates are a plurality of tangently disposed worms 46, preferably three in number, which mesh with the central worm gear 34 at uniformly spaced points circumferentially thereof. A beveled pinion 47 is fixed to one end of each of the worm shafts 45 and meshes with similar beveled pinions 48 fixed on the inner ends of radially extending shafts 49. The shafts 49 are also journalled in the plates 35 and 36 and are provided at their outer ends with bevelled pinions 50 which mesh at diametrically disposed points with two opposed bevel ring gears 51 and 52. These ring gears are rotatably mounted on the outer circumferential surfaces of the plates 35 and 36 respectively and are prevented from becoming axially displaced therefrom by annular shoulders 53 and 54 formed on the plates 37 and 36. Annular brake drums 55 and 56 are fixed to the ring gears 51 and 52, respectively, by shear pins 57 and are at times frictionally engaged by brake bands 58. The brake bands are of usual construction, being fixed to a suitable frame or standard 59 intermediate their ends by a bolt 60 while their ends are eccentrically connected with operating levers 61 which are pivoted to another frame or standard 62 by a bolt 63.

In operation, if it is desired to rotate the propeller blades 26 in one direction so as to increase their pitch, one of the brake bands 58 is tightened by means of its operating lever 61 so as to slow down or stop the rotation of the associated drum and ring gear. This will cause the bevel pinions 50 to rotate around this gear with a planetary movement and to rotate the worms 46 about their axes through the medium of the bevel pinions 47 and 48, while these worms are revolving bodily about the axis of the drive shaft. The rotating and revolving worms 46 will rotate the central worm gear 34 and the quill shaft 31 at a faster rate than the plates 35, 36 and 37 and the drive shaft 19a with the result that the propeller blades 26 will be rotated about their axes X while the hub is rotating about its axis. The pitch of the blades 26 will thus be increased. Conversely if it is desired to decrease the pitch of the propeller blades 26, the other brake band is tightened by means of its lever so as to slow down or stop the rotation of the drum and its associated ring gear. This will cause a reverse rotation of the parts just described with the result that the blades 26 will be rotated about their axes X in an opposite direction.

A pointer 64 is preferably fixed to the extreme forward end of the quill shaft 31 by a bolt 65 which extends radially outwardly through a slot formed in the face of the plate 36 and indicates on a suitably calibrated scale 66 provided on the circumference of the flange 43 the degree of pitch of the blades 26. The pointer 64 and scale 66 will of course be rotating but may be observed with the aid of a stroboscope. The pointer only moves through a relatively small angle comparable with the relative angular displacement of the drive and quill shafts.

It will be understood that the above description and accompanying drawings comprehend only the general and preferred embodiment of the invention and that various changes in construction, proportion and arrangement of the parts may be made within the scope of the appended claim without sacrificing any of the advantages of the invention.

The invention described herein may be manufactured and/or used by or for the Government of the United States of America for governmental purposes without the payment of any royalties thereon or therefor.

We claim:

A variable pitch propeller comprising a hollow drive shaft; a hub carried by said shaft; a blade mounted on said hub for rotatable adjustment about a radially extending axis; a quill shaft extending through said drive shaft and operatively connected with said blade to rotate the same about said axis, a housing arranged coaxially of said drive shaft; a two-part plate secured to said housing and having an internal flange engageable with a circumferential groove in said drive shaft for preventing axial movement of said housing on said drive shaft; a collar keyed to said drive shaft and secured to said housing for preventing rotative movement of said housing on said drive shaft; a worm gear disposed within said housing and fixed to said quill shaft; planetary gear mechanism carried by said housing and intermeshing with said worm gear; a ring gear mounted on said housing and rotatable with respect thereto for rotating said planetary gear mechanism to rotate said worm gear and quill shaft in selected directions and at selected relative speeds with respect to said drive shaft, thus to adjust the pitch of said blade, and brake mechanism for controlling the rotation of said ring gear.

ROBERT J. RUTHS.
HARRY L. DODSON.